(12) United States Patent
Bonanno

(10) Patent No.: US 10,834,500 B2
(45) Date of Patent: *Nov. 10, 2020

(54) DUAL-RADIO GAMING HEADSET

(71) Applicant: Voyetra Turtle Beach, Inc., White Plains, NY (US)

(72) Inventor: Carmine J. Bonanno, White Plains, NY (US)

(73) Assignee: Voyetra Turtle Beach, Inc., White Plains, NY (US)

(*) Notice: Subject to any disclaimer, the term of this patent is extended or adjusted under 35 U.S.C. 154(b) by 107 days.

This patent is subject to a terminal disclaimer.

(21) Appl. No.: 16/010,627

(22) Filed: Jun. 18, 2018

(65) Prior Publication Data

US 2018/0302712 A1 Oct. 18, 2018

Related U.S. Application Data

(63) Continuation of application No. 13/101,774, filed on May 5, 2011, now Pat. No. 10,057,680.

(51) Int. Cl.
| | | |
|---|---|---|
| *H04R 3/00* | (2006.01) | |
| *A63F 13/98* | (2014.01) | |
| *A63F 13/25* | (2014.01) | |
| *H04R 5/033* | (2006.01) | |
| *H04R 27/00* | (2006.01) | |

(52) U.S. Cl.
CPC ............ *H04R 3/00* (2013.01); *A63F 13/02* (2013.01); *A63F 13/25* (2014.09); *A63F 2300/572* (2013.01); *A63F 2300/6063* (2013.01); *H04R 5/033* (2013.01); *H04R 27/00* (2013.01); *H04R 2227/003* (2013.01); *H04R 2420/01* (2013.01); *H04R 2420/07* (2013.01)

(58) Field of Classification Search
CPC ...... H04R 5/033; H04R 2420/03; H04R 3/00; A63F 2300/572; A63F 13/12; A63F 13/02; A63F 13/25; H04M 1/6066; H04M 1/7253
See application file for complete search history.

(56) References Cited

U.S. PATENT DOCUMENTS

| 6,006,115 A | 12/1999 | Wingate |
|---|---|---|
| 6,519,475 B1 | 2/2003 | Kim |

(Continued)

FOREIGN PATENT DOCUMENTS

EP 1494364 A1 1/2005

OTHER PUBLICATIONS

Summons to Attend Oral Proceedings from European Patent Application No. 11166668.1 dated Dec. 21, 2015.

(Continued)

*Primary Examiner* — David L Lewis
*Assistant Examiner* — Robert E Mosser
(74) *Attorney, Agent, or Firm* — McAndrews, Held & Malloy, Ltd.

(57) ABSTRACT

A gaming machine having an audio channel outputting game sound and an audio channel intaking microphone sound and outputing chat sound is coupled with a headset having earpieces and a microphone and a Bluetooth transceiver in the headset for sending and receiving the microphone and chat sounds. A radio receiver or wired connection in the headset receives the game sounds. Circuitry in the headset is connected between the transceiver and receiver for mixing the microphone, chat, and game sounds and feeding them all to the earpieces.

20 Claims, 2 Drawing Sheets

(56) References Cited

U.S. PATENT DOCUMENTS

| | | |
|---|---|---|
| 6,658,267 B1 | 12/2003 | Baranowski |
| 7,245,502 B2 | 7/2007 | Kochis et al. |
| 7,395,090 B2 | 7/2008 | Alden |
| 8,064,972 B2 | 11/2011 | McLoone et al. |
| 2002/0067825 A1 | 6/2002 | Baranowski |
| 2005/0159833 A1 | 7/2005 | Giaimo et al. |
| 2007/0004472 A1 | 1/2007 | Gitzinger |
| 2007/0021205 A1 | 1/2007 | Filer et al. |
| 2008/0280654 A1 | 11/2008 | Solomon |
| 2009/0284553 A1 | 11/2009 | Seydoux |
| 2010/0040240 A1 | 2/2010 | Bonanno |
| 2010/0150383 A1 | 6/2010 | Sampat |
| 2011/0130203 A1 | 6/2011 | Reiss et al. |
| 2012/0237053 A1 | 9/2012 | Alam et al. |

OTHER PUBLICATIONS

Bakalar Jeff, "Ear Force PX5 Programmable Headset (with Bluetooth)", CNET Reviews, Apr. 28, 2011, XP55232276. Retrieved on Nov. 30, 2015.

Christopher Grant: "Wireless 360 Headset using Bluetooth", Mar. 6, 2006, XP55232277, retrieved from the internet: URL:http://www.engadget.com/2006/03/06/wireless-360-headset-using-bluetooth/. Retrieved on Nov. 30, 2015.

Owen Good, "A Fistful of Dollars Gets you an Earful with Turtle Beach's PX5", Mar. 25, 2011, XP055232280, retrieived from the internet: URL:http://kotaku.com/578203/a-fistful-of-dollars-gets-you-an-earful-with-turtle-beachs-px5. Retrieved on Nov. 30, 2015.

"PX5 Turtle Beach User Guide", Mar. 10, 2011, XP055232286, retrieved from the Internet: URL:http://cdn-assets.turtlebeach.com/products/366/px5_user_guide_web.pdf. Retrieved on Nov. 30, 2015.

Bakalar Jeff, "Logitech F540 Wireless Headset Review—CNET", Oct. 27, 2010, XP055117006, retrieved from the internet: URL:http://www.cnet.com/products/logitech-f540-wireless-headset/ [retrieved on May 8, 2014] (3 pages).

European Patent Office, Communication with extended European search report, Application No. 11166668.1-1991, dated May 15, 2014 (6 pages).

European Examination Report dated Jul. 30, 2015 from European Patent application No. 11166668.1-1901.

Anonymous, "Stereo Bluetooth (a2dp) Support", PlayStation.Blog, Aug. 10, 2010, XP055204281, retrieved from the internet; U RL :https://web.archive.org/web/201 0081 0004328/http://share.blog.us.playstation.com/ideas/2010/03/17/ stero-bluetooth-a2dp-supportl [retrieved on Jul. 23, 2015].

Anonymous, "Audio Output through bluetooth headset", PlayStation Forums, Jan. 15, 2011 (Jan. 15, 2011), XP055204284, Retrieved from the Internet: URL:http://community.us.playstation.com/t5/PlaysStation-General/AudioOutput-through-bluetooth-headset/td-p/30891872 [retrieved on Jul. 23, 2015].

Pirillo, Chris, "Can a Bluetooth Headset Connect to More than One Device?", Jul. 16, 2009 (Jul. 16, 2009), XP055204288, Retrieved from the Internet: URL:https://web.archive.org/web/20090716222636/http://chris.pirillo.comlcan-a-bluetooth-headset-connect-to-more-than-one-device [retrieved on Jul. 23, 2015].

Judd, William, "What is Multipoint?", Mobile Fun Blog, Aug. 11, 2008 (Aug. 11, 2008), XP055204289, Retrieved from the Internet: U RL:httpl/www.mobilefun.co.uk/blog/2008/08/what-is-multipointi [retrieved on Jul. 23, 2015].

DUAL-RADIO GAMING HEADSET

RELATED APPLICATION(S)

The present application is a continuation of application Ser. No. 13/101,774, filed on May 5, 2011, which is hereby incorporated herein by reference in their entirety.

FIELD OF THE INVENTION

The present invention relates to a headset used in the field of computer games played on personal computers or gaming consoles and, in particular, to multi-player games which are played over a local area network or the Internet.

BACKGROUND OF THE INVENTION

A typical computer game console, such as the Microsoft Xbox™ or Sony PlayStation™, provides three primary sources of sound. The first is the game audio. The second is the chat voices of other players communicating in multi-player games that allow two or more players to compete against each other via a local network or over the Internet. The third is the voice of the player wearing the headset and speaking into a microphone attached to the headset. The game sounds and chat sounds are separately adjustable so the sounds of game and chat can be balanced against each other.

On a PlayStation™ game console, the chat and microphone sounds are transmitted via a Bluetooth radio signal. This requires that the player wear a Bluetooth ear piece, similar to what is commonly used for hands-free communication with a mobile phone. When wearing this Bluetooth ear piece, the player's ear is blocked from hearing the game sound emanating from the speakers connected to the game console. This inhibits enjoyment of the game by making it difficult to hear the game in full stereo or surround sound. In addition, wearing the Bluetooth ear piece interferes with the use of a stereo headset to reproduce the game sound from the console. Therefore, the player is faced with a choice of either hearing only the game while wearing the headset or hearing the online chat sound with the ear piece, and listening to the game sound emanating from speakers with the other ear that is not covered by the ear piece.

On an Xbox™ game console, the online chat signal is fed to the headset via a cable between the Xbox™ controller and a so-called "communicator" headset that is simply a microphone connected to a speaker cup that sits over one ear. Some stereo gaming headsets provide a method of connecting this cable to the headset such that the sound from the online chat is combined with the game sound, allowing the player to hear both at the same time. This method, however, ties the headset to the controller device via the cable that to some degree defeats the purpose of using a wireless headset to hear the game sound from the console. Thus, when using the connection cable between the headset and controller, the wire interferes with the unencumbered playing style expected of a headset wireless system.

U.S. Pat. No. 7,395,090 describes a method for integrating the sound of a personal music player and a mobile phone when using a headset or ear buds. In order to switch between the two sources of sound, it is necessary to remove the headset. When used with a mobile phone, the user may communicate with the mobile phone while wearing headphones.

US published application US 2008/0280654 describes a headphone apparatus that includes an FM radio for receiving sound and a Bluetooth radio for wireless communication, along with a means of controlling the headset via a wireless connection to an external control unit.

U.S. Pat. No. 6,519,475 describes an earphone-microphone combination that allows a user to simultaneously use both a mobile phone and a radio receiving set with a common earphone-microphone combination. A switching device selects between the radio and the mobile phone. This earphone-microphone combination with a switching mechanism eliminates the need for the user to carry separate headsets for listening to a radio and speaking on the mobile phone. Instead, the user can use both a mobile phone and a radio simultaneously, with a common earphone-microphone combination. Manual switching is required to switch between sound sources and the radio source is not summed with the phone source, but rather the use of one precludes the use of the other. A phone call cannot be answered while simultaneously listening to the game audio via the second radio in the headset.

U.S. Pat. No. 6,658,267 and published application 2002/0067825 both describe a headset with an integrated commercial radio receiver and wireless telephone device that incorporates a microphone for speaking on a wireless telephone call and a method of selecting between the two such that the user can listen to a radio broadcast or conduct a wireless telephone call. The inventions essentially describe the integrated functionality of radio tuner and a wireless telephone unit without requiring the user to switch between the two devices. These inventions differ from the current invention in that they are limited to the use of an AM/FM radio combined with a cordless phone, whereas the current invention is designed to improve communication during game play by integrating a Bluetooth radio for voice communication with a second radio for game communication.

U.S. Pat. No. 6,006,115 describes a headset that incorporates a radio for receiving wireless phone calls and wireless audio programming, so the user may enjoy the wireless audio programming without missing a phone call. The phone call originates from a wireless base unit and is not specified as being Bluetooth enabled. This invention therefore differs from the current invention in that it does not specify two separate radios, one being of the Bluetooth standard used for voice communication and another of a proprietary standard used for listening to the game sound.

OBJECTS OF THE INVENTION

It is therefore an object of the present invention to provide an improved dual radio gaming headset.

Another object is the provision of such an improved dual radio gaming headset that overcomes the above-given disadvantages.

Another object is to integrate the ability to communicate via game play while still hearing the game audio, thus providing a method of chatting with online players, chatting via a mobile phone and listening to streaming music, all while listening to the game sound.

SUMMARY OF THE INVENTION

A gaming machine having an audio channel outputting game sound and an audio channel intaking microphone sound and outputting chat sound is coupled according to the invention with a headset having earpieces and a microphone and a Bluetooth transceiver in the headset for sending and receiving the microphone and chat sounds. A radio receiver or wired connection in the headset receives the game sounds.

Circuitry in the headset is connected between the transceiver and receiver for mixing the microphone, chat, and game sounds and feeding them all to the earpieces.

The instant invention thus provides a means for wireless delivery of chat and microphone signals and can eliminate the need for a wired connection on an Xbox™ controller. Furthermore the invention integrates the Bluetooth radio in a gaming headset to combine the sound of game and chat on the PlayStation™ game console without the need for wires or other means to carry the chat and microphone signals. The result is an enhanced audio experience in a multiplayer game by providing a wireless chat and microphone connection to both the Xbox™ and PlayStation™ game consoles via a Bluetooth radio that is combined with the normal wireless game signal in the headset. On an Xbox™ game console, this invention eliminates the wire connection between the headset and Xbox™ controller to connect the chat signals between these devices. On both the Xbox™ and PlayStation™ game consoles, this invention combines the game and chat signals via two radios to provide a completely wireless experience.

Another benefit of this invention is the ability for the Bluetooth radio used for chat and microphone communication to also be used for communicating with a mobile phone and Bluetooth audio streaming device, such as a digital audio player that is Bluetooth enabled. This additional functionality allows the player to make and receive phone calls, and listen to music, while playing the game.

BRIEF DESCRIPTION OF THE DRAWING

The above and other objects, features, and advantages will become more readily apparent from the following description, reference being made to the accompanying drawing where the terms "PlayStation" and "Xbox" are trademarks of Sony Corporation and Microsoft Corporation, respectively. In the drawing.

DETAILED DESCRIPTION

Figure 1:
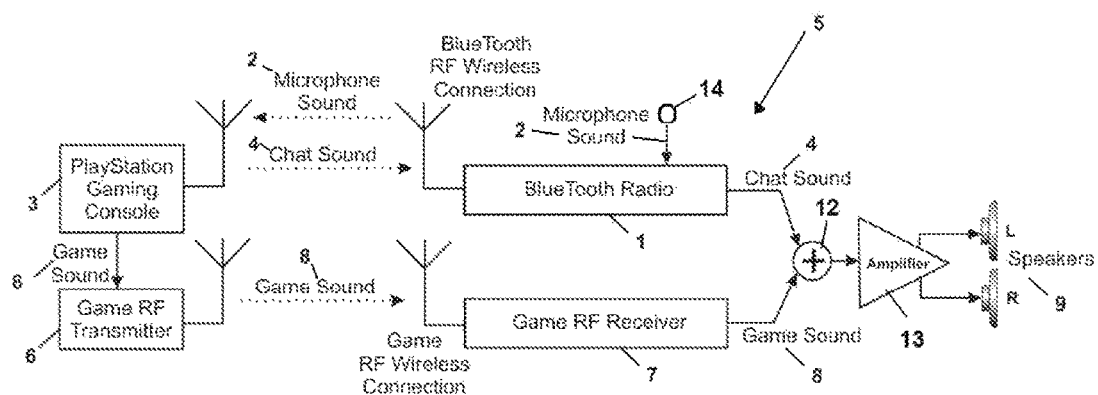
FIG. 1 is a flow chart illustrating two radio modules in a headset communicating with a PlayStation™ game console, with the Bluetooth radio being used for chat and microphone communication directly with the Bluetooth radio built into the PlayStation™.

This invention improves the experience of using a wireless gaming headset while communicating online with other players. A typical embodiment of the invention is illustrated in FIG. 1 that shows the signal flow of microphone, chat and game sounds 2, 4, and 8 between a wireless gaming headset 5 having two earpieces 9 and a PlayStation™ game console 3. Although in the embodiments described herein, the game audio 8 is transmitted via a wireless connection, in some embodiments the game audio 8 may be connected via a wire and the Bluetooth radio may be the only radio used in this device for the microphone sound 2 and chat sound 4. It is therefore an essential aspect of this invention that there are two different audio sources, one being game audio 8 and the other being voice communication audio 2 and 4, and the voice communication is transmitted and received via Bluetooth as described herein.3

In FIG. 1 a Bluetooth radio transceiver 1 is provided in the headset 5. A headset microphone 14 is connected to the input of this Bluetooth radio 1 and the voice signal 2 from the microphone is wirelessly transmitted via the Bluetooth radio 1 to the built-in Bluetooth radio transceiver in the PlayStation™ console 3, thereby enabling the user to speak to others online wirelessly. The PlayStation™ console transmits the chat sound 4 from online players via Bluetooth to the headset Bluetooth radio 1 that then outputs this audio chat signal 4. The PlayStation™ game sound 5 is connected to an external RF transmitter 6 that wirelessly transmits the game sound to a radio receiver 7 in the headset and handles the game sound signal 8. The game and chat signals 8 and 4 are mixed or summed together in a circuit 12, then boosted in an amplifier 13 and sent to the headset speakers 9. Thus the headset 5 provides wireless connectivity for the game sound 8, chat sound 4 and microphone sound 2 by its use of two radios 1 and 7, one of which uses the Bluetooth standard.

Figure 2:
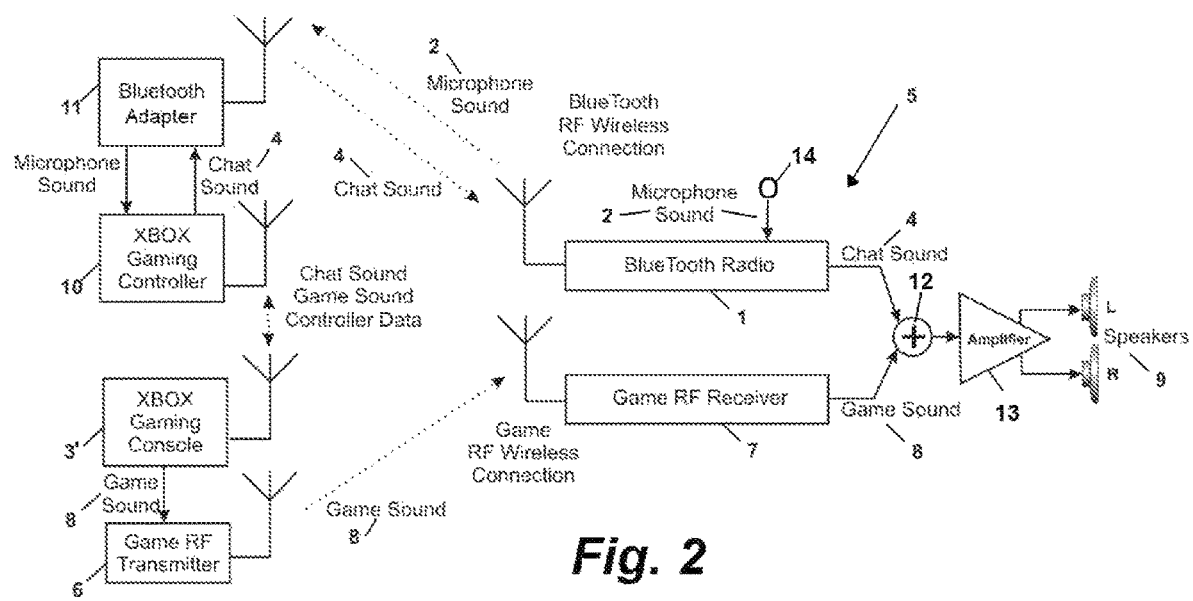
FIG. 2 is a flow chart illustrating two radio modules in a headset communicating with an Xbox™ game console, with the Bluetooth radio being used for chat and microphone communication with a Bluetooth radio connected to the Xbox™ wireless controller.

A similar configuration can be implemented on an Xbox™ console 3' as illustrated in FIG. 2. As in the PlayStation™ example, the Xbox™ game sound 8 is fed to an RF transmitter 6 and is wirelessly transmitted to the headset game radio 7 to generate the headset game sound 8. The Xbox™ 3', unlike the PlayStation™ 3 of FIG. 1, does not use the Bluetooth protocol for transmitting the microphone and chat sounds 2 and 4. Instead, the console 3' transmits chat, voice and data to a wireless controller 10 into which a set of wired headphones can be plugged. In this invention, a Bluetooth radio 11 connected to the controller 10 transmits the chat signal 4 and receives the microphone signal 2 from the headset Bluetooth radio 1. As in the PlayStation™ example, the chat signal 4 from the Bluetooth radio is summed at 12 with the game signal 8 and the mixed signal is amplified at 13 and sent to the headset speakers 9.

Figure 3A:
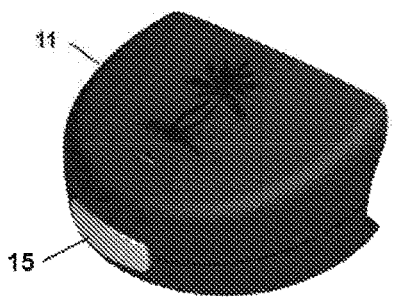
FIGS. 3A, 3B, and 3C are illustrations of the Bluetooth adapter for the Xbox™ controller, FIGS. 3A and 3B showing the adapter and FIG. 3C showing how it connects to the Xbox™ controller.
Figure 3B:
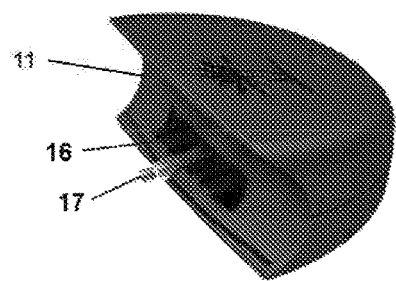
Figure 3C:

FIGS. 3A, 3B, and 3C show an embodiment of the Bluetooth adapter 11 for the Xbox™ controller 3', using the same reference numerals as FIG. 2 where appropriate. The adapter 11 is encased in a small housing with a button 15 that pairs the device with the headset Bluetooth radio 1 when pressed and held. After the unit is paired with the headset 5 and communication is established, the microphone feature may be muted by quickly pressing and releasing the button 15. Power for the device is connected via two power pins 16 that draw power from the Xbox™ controller 3' when the device is mounted thereon. The microphone and chat signals 2 and 4 are connected via a 2.5 mm connector 17. The device 11 is secured to the Xbox™ controller 3' via its headset jack, integrating seamlessly with the controller design.

Figure 4:
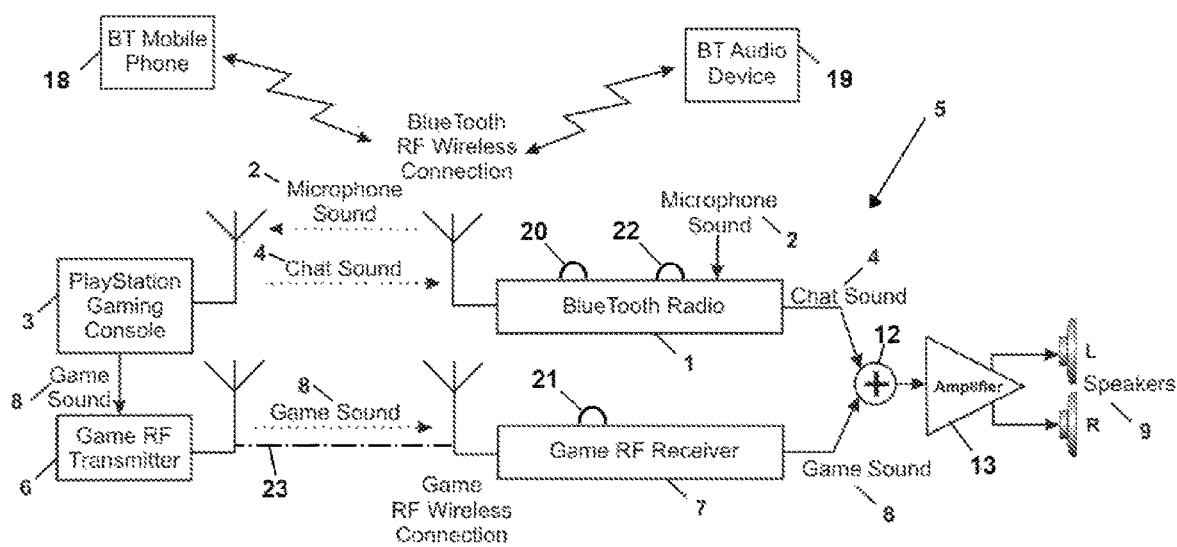
FIG. 4 is a flow chart illustrating the Bluetooth radio communicating with a PlayStation™ game console, a mobile phone and a Bluetooth enabled digital music player.

FIG. 4 illustrates another benefit of the invention as shown in FIG. 1, namely its ability to answer mobile phone calls while playing a game. Here, a mobile phone 18 is paired to the Bluetooth radio 1 in the headset using a so-called "multipairing" protocol that enables more than one Bluetooth device to be paired to the Bluetooth radio. When a phone call occurs, the Bluetooth radio 1 in the headset 5 signals the user of an incoming call via a tone on the chat sound 4. The user may then activate a switch 22 on the headset to answer the call, much in the same manner in which a call is answered with a standard Bluetooth ear piece commonly used with mobile phones. In this scenario, however, the phone conversation occurs within the headset during game play, mixed with the game sound and replacing the chat. Thus, the user does not have to stop playing the game in order to participate in the phone call. The voice of the caller replaces the voices of online players so the Bluetooth chat signal 4 is summed with the game and routed to the headset speakers 9, allowing the user to accept a phone call while in the middle of playing a game. The microphone signal 2 is routed to the Bluetooth radio in the headset and transmitted to the mobile phone 18 so the headset microphone may be used to speak on the phone call. In addition the Bluetooth radio 1 and the game RF receiver 7 are equipped with respective volume controls for balancing the two sound signals. Here also, dot-dash line 23 represents an actual wired connection that could replace the Bluetooth channel used for microphone and chat sound 2 and 4.

In this embodiment of the invention, the same Bluetooth radio 1 may also be used to play stereo audio from a device 19 equipped with the so-called A2DP protocol that is commonly used in for streaming audio via Bluetooth from music devices. When used in this manner, the chat sound 4 is replaced with the stereo music from the Bluetooth audio device 19 and summed with the game sound 8 so the user can hear the game and the music simultaneously.

Thus, it can be seen from the configuration in FIG. 4 that the invention as the unique ability to provide a communication link to the game console for online chat, a communication link to a mobile phone for taking phone calls during a game, and a communication link to a wireless A2DP audio device for listening to music during a game. All of this is accomplished by virtue of adding the Bluetooth radio to the headset in combination to the game radio, as described herein.

I claim:

1. A system comprising:
   a headset comprising:
      a microphone operable to generate a microphone output,
      a first transmitter operable to wirelessly transmit the microphone output,
      a first receiver operable to wirelessly receive a chat signal,
      a second receiver operable to wirelessly receive a game sound from a gaming machine,
      a signal processor operable to generate an audio signal by mixing the microphone output, the chat signal and the game sound, and
      at least one earpiece operable to output the audio signal, wherein:
         the gaming machine is operably coupled to a game controller, and
         the game controller is operable to receive the microphone output, at least in part.

2. The system of claim 1, wherein the game controller is operable to transmit the microphone output to the gaming machine.

3. The system of claim 1, wherein the game controller is operably coupled to an adapter, and wherein the adapter comprises a third receiver operable to wirelessly receive the microphone output from the headset.

4. The system of claim 1, wherein the game controller is operably coupled to an adapter, and wherein the adapter comprises a second transmitter operable to wirelessly transmit the chat signal to the headset.

5. The system of claim 1, wherein the game controller is operably coupled to an adapter, and wherein the adapter comprises a Bluetooth transceiver that comprises a second transmitter and a third receiver.

6. The system of claim 1, wherein the headset comprises a Bluetooth transceiver, and wherein the Bluetooth transceiver comprises the first transmitter and the first receiver.

7. The system of claim 6, wherein the Bluetooth transceiver is capable of simultaneous pairing with a plurality of devices, and wherein a switch is operable to select between receiving the chat signal and receiving an alternative sound source.

8. The system of claim 7, wherein the switch is on the headset.

9. The system of claim 1, wherein the headset comprises a control device operable to balance the game sound against the chat signal and the microphone output.

10. The system of claim 1, wherein at least one of the first receiver and the second receive is operable to receive a signal that is encoded by a digital protocol.

11. A method comprising:
   generating a microphone output with a microphone;
   wirelessly transmitting the microphone output with a first transmitter, wherein a game controller is operable to receive the microphone output, at least in part;
   wirelessly receiving a chat signal with a first receiver;
   wirelessly receiving, via a second receiver, a game sound from a gaming machine;
   generating an audio signal by mixing the microphone output, the chat signal and the game sound; and
   output the audio signal with at least one earpiece of a headset.

12. The method of claim 11, wherein the method comprises transmitting the microphone output from the game controller to the gaming machine.

13. The method of claim 11, wherein the game controller is operably coupled to an adapter, and wherein the method comprises wirelessly transmitting microphone output from the headset to the adapter.

14. The method of claim 11, wherein the game controller is operably coupled to an adapter, and wherein the method comprises wirelessly transmitting the chat signal from the adapter to the headset.

15. The method of claim 11, wherein the game controller is operably coupled to an adapter, and wherein the adapter comprises a Bluetooth transceiver that comprises a second transmitter and a third receiver.

16. The method of claim 11, wherein the headset comprises a Bluetooth transceiver, and wherein the Bluetooth transceiver comprises the first transmitter and the first receiver.

17. The method of claim 16, wherein the Bluetooth transceiver is capable of simultaneous pairing with a plurality of devices, and wherein a switch is operable to select between receiving the chat signal and receiving an alternative sound source.

18. The method of claim 17, wherein the switch is on the headset.

19. The method of claim 11, wherein the headset comprises a control device, and wherein the method comprises balancing the game sound against the chat signal and the microphone output.

20. The method of claim 11, wherein at least one of the first receiver and the second receive is operable to receive a signal that is encoded by a digital protocol.

* * * * *